United States Patent
Kikugawa

(10) Patent No.: US 8,804,476 B2
(45) Date of Patent: Aug. 12, 2014

(54) OPTICAL INFORMATION RECORDING MEDIUM, RECORDING AND REPRODUCTION METHOD, AND RECORDING AND REPRODUCTION DEVICE

(71) Applicants: Hitachi Consumer Electronics Co., Ltd., Tokyo (JP); Hitachi-LG Data Storage, Inc., Tokyo (JP)

(72) Inventor: Atsushi Kikugawa, Tokyo (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 13/896,791

(22) Filed: May 17, 2013

(65) Prior Publication Data

US 2014/0036652 A1 Feb. 6, 2014

(30) Foreign Application Priority Data

Aug. 1, 2012 (JP) .................... 2012-170703

(51) Int. Cl.
*G11B 7/24* (2013.01)
(52) U.S. Cl.
USPC .................... 369/275.4; 369/275.3
(58) Field of Classification Search
USPC .......... 369/275.1, 275.3, 275.4, 47.19, 59.25, 369/59.26, 47.27, 44.26, 44.29, 44.12, 278, 369/279
See application file for complete search history.

(56) References Cited

U.S. PATENT DOCUMENTS

| 6,292,458 | B1 * | 9/2001 | Eguchi et al. | 369/275.3 |
| 6,473,377 | B2 * | 10/2002 | Eguchi et al. | 369/47.47 |
| 6,754,166 | B2 * | 6/2004 | Arioka et al. | 369/275.1 |
| 7,196,984 | B2 * | 3/2007 | Noda et al. | 369/47.19 |
| 7,224,651 | B2 * | 5/2007 | Ko et al. | 369/47.27 |
| 7,417,942 | B2 * | 8/2008 | Miyamoto et al. | 369/275.3 |
| 2005/0117490 | A1 | 6/2005 | Kojima et al. | |

FOREIGN PATENT DOCUMENTS

JP 2005-166120 6/2005

OTHER PUBLICATIONS

Naoyasu Miyagawa et al., Land and Groove Recording for High Track Density on Phase-Change Optical Disks, Jpn. J. Appl. Phys, Nov. 1993, pp. 5324-5328, vol. 32, Part 1, No. 11B.
Shoei Kobayashi et al., Wobble-Address Format of the Blu-ray Disc, Jpn. J. Appl., Phys., Feb. 2003, pp. 915-918, vol. 42, Part1, No. 2B. Annex J, Recording Unit Block positioning.

* cited by examiner

*Primary Examiner* — Ali Neyzari
(74) *Attorney, Agent, or Firm* — Antonelli, Terry, Stout & Kraus, LLP.

(57) ABSTRACT

In the land-groove method, wobble interference is reduced. STW modulation is used as wobble modulation for a part where wobble interference can occur, for example, a part where the configurations of both side walls of the groove are not the same and groove width modulation is unavoidable. Thereby, the amplitude of the groove width modulation can be suppressed to a quarter of that when BPSK modulation is used.

13 Claims, 19 Drawing Sheets

FIG. 11A  ADIP data

| layer | segment | track | L/G | Aux |
|---|---|---|---|---|
| 101 | 102 | 103 | 104 | 105 |

FIG. 11B  Gray coded track number

| layer | segment | Gray code | Aux |
|---|---|---|---|
| 101 | 102 | 106 | 105 |

FIG. 11C  append parity

| layer | segment | Gray code | Aux | parity |
|---|---|---|---|---|
| 101 | 102 | 106 | 105 | 100 |

FIG. 11D  physical modulation format

| BPSK | STW |
|---|---|
| 107 | 108 |

FIG. 11E  wobble waveform

| sync | BPSK | STW(L) | STW(G) |
|---|---|---|---|
| 109 | 110 | 111 | 112 | if Land → STW(L)
if Groove → STW(G)

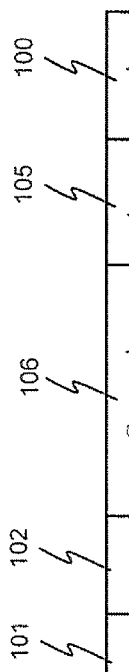
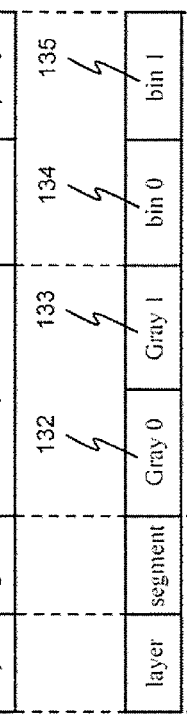
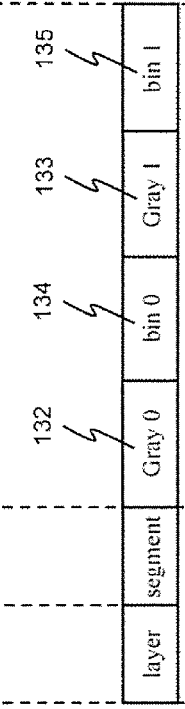
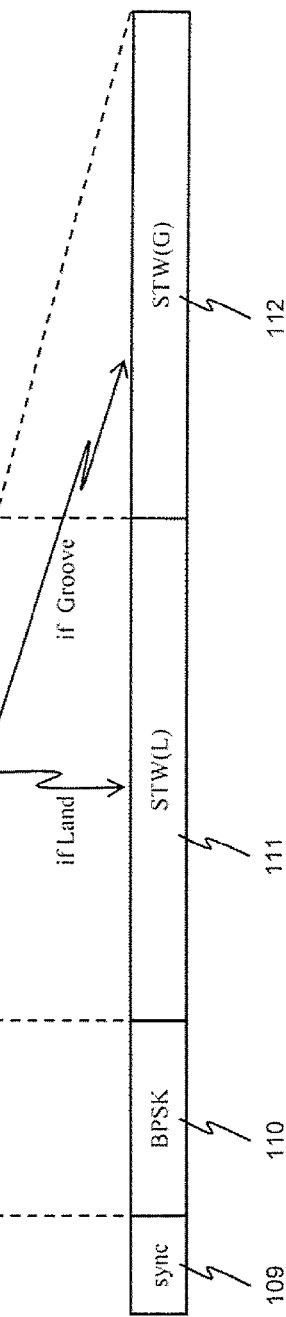
FIG. 12A  append parity
FIG. 12B  block division
FIG. 12C  interleave
FIG. 12D  physical modulation format
FIG. 12E  wobble waveform

| | | | | | |
|---|---|---|---|---|---|
| FIG. 14A | ADIP data | layer 101 | zone 154 | segment 102 | track 103 | L/G 104 | Aux 105 |
| FIG. 14B | Gray coded track number | layer 101 | zone 154 | segment 102 | Gray code 106 | Aux 105 |
| FIG. 14C | append parity | layer 101 | zone 154 | segment 102 | Gray code 106 | Aux 105 | parity 100 |
| FIG. 14D | physical modulation format | BPSK 107 | STW 108 |
| FIG. 14E | wobble waveform | sync 109 | BPSK 110 | STW(L) 111 / STW(G) 112 | if Land → STW(L)
if Groove → STW(G)

OPTICAL INFORMATION RECORDING MEDIUM, RECORDING AND REPRODUCTION METHOD, AND RECORDING AND REPRODUCTION DEVICE

INCORPORATION BY REFERENCE

The present application relates to and claims priority from Japanese Patent Application No. 2012-170703, filed on Aug. 1, 2012, the entire disclosure of which is incorporated herein by reference into this application.

BACKGROUND OF THE INVENTION

1. Field of the Invention

The present invention relates to a medium on which information is recorded by using light and an information recording and reproduction device using the same.

2. Description of the Related Art

Some of the terms used in the following are expressions used for Blu-ray Disc (BD). These might be called by different terms for systems other than BD. However, one of ordinary skill in the art can easily read the terms as the different ones.

The enlargement of the recording capacity of optical discs has been realized by increasing the number of recording layers per disc as well as by shortening the wavelength of the light source and increasing the numerical aperture (NA) of the objective lens. For BD, using a blue semiconductor laser and a high NA objective lens with an NA of 0.85, a recording capacity of 50 GB has been realized with two layers. Further, in 2010, by increasing the number of recording layers to three to four and increasing the surface recording capacity at the same time, BDXL having a recording capacity of not less than 100 GB was put into practical use.

Although the shortening of the wavelength of the recording and reproduction light and the increase of the NA of the objective lens are near the limit, a method explained in Jpn. J. Appl. Phys., Vol 32 (1993) pp. 5324-5328 (Non-Patent Document 1) is considered in which by using the land-groove effect, recording is performed on the land and the groove to narrow the track pitch, thereby further increasing the surface recording capacity. Hereinafter, this method using the land-groove effect will be referred to as land-groove method. Actually, DVD-RAM is known as an optical disc system to which the land-groove method is applied.

When a recordable-type optical disc system using the land-groove method is constructed, a method of forming the address information on the disc is one of the fundamental problems to be solved. On many recordable-type optical discs, information is recorded along a guide groove formed spirally on the disc substrate, or the land. By wobbling the groove at predetermined intervals and detecting this wobble at the time of recording or reproduction, a clock synchronized with the rotation speed can be obtained. Further, by adding a modulation to the wobble, auxiliary information related to the address and the disc is recorded as a physical form in the groove. By detecting the address information recorded in the groove (ADIP: address in pre-groove), information can be recorded in a desired position on the disc.

In the case of a method in which recording is performed only in the groove, for the wobble, the side walls on the both sides of the groove are shaped into the same configuration. The same applies to the case where recording is performed only on the land. In the following, when the groove is the recording area, this will be referred to as groove track, and likewise, when the land is the recording area, this will be referred to as land track. Therefore, in the case of the land-groove method, a land track and a groove track are present. In the land-groove method, the adjoining land track and groove track share the same side wall. For this reason, if an independent address is assigned to each of the land track and the groove track, a section occurs where the configurations of the side walls on both sides of the groove or the land cannot be made the same. That is, since the width of the groove or the land changes in such a section, an adverse effect is observed that the amplitude of the recorded signal is modulated as the track width fluctuates. Moreover, in the pertinent section, an adverse effect that the amplitude of the wobble signal also fluctuates is received at the same time. In the following, these phenomena will be referred to as wobble interference. Although the term wobble interference might refer to a different phenomenon in the pertinent technical field, it is used to mean the above in this specification.

If an independent address is assigned to each of the land track and the groove track as described above, although the occurrence of the wobble interference is unavoidable, the frequency thereof can be reduced. For example, according to the technique disclosed in JP-A-2005-166120 (Patent Document 1), by using Gray code for part of the address information, the frequency of the wobble interference due to the adjoining track can be reduced.

In the following, when it is unnecessary to distinguish between the groove and the land, they will be referred to merely as a track.

According to the technique described in Patent Document 1, as means for making the configurations of the adjoining grooves the same as each other as much as possible in order to reduce the wobble interference, Gray code is used for part of the address information. However, since BPSK (binary phase shift keying) is used as the wobble modulation means, there is a problem in that a high wobble interference occurs in a part where the configurations of the side walls of the adjoining grooves are not the same as each other.

Moreover, according to the technique described in Patent Document 1, it is not performed to protect the ADIP by an error correction code (ECC). This is because even if a systematic code is used, since the code word is different from that of the adjoining track, the wobble configurations of this part are highly likely different from each other and as a result, the effect of reducing the frequency of the wobble interference is lessened or lost. The technique described in Patent Document 1 has a problem in that the reliability of the ADIP information reproduced from the wobble signal is low since the ADIP is not protected by the error correction code. In particular, it has a problem of being extremely vulnerable to an ADIP error due to a disc fault such as a defective wobble configuration and an ADIP error due to dust and dirt adhering to the disc surface.

SUMMARY OF THE INVENTION

An object of the invention is to provide a method and an optical information recording medium for solving the above-mentioned problem and realizing an ADIP system that is highly reliable and less affected by the wobble interference, and an optical information recording and reproduction method and a recording and reproduction device for the optical information recording medium.

An optical information recording medium of the invention has a constant angular wobble format, data held by the wobble is classified based on the frequency of occurrence of the wobble interference, and a waveform where the amplitude of the wobble interference is smaller than twice the amplitude of the carrier wobble is used as a wobble modulated waveform in a part holding the data where the wobble interference occurs. As the waveform where the amplitude of the wobble interference is smaller, a waveform that is the carrier wobble on which a harmonic of the carrier wobble is superimposed, for example, an STW (saw-tooth wave) may be used. The ADIP data is protected by a systematic code.

Moreover, means is provided for performing data discrimination adaptively to a modulated waveform applied to each part of the constant angular wobble format.

According to the invention, the influence of the wobble interference can be suppressed. In addition, an ADIP system can be constructed that is highly reliable and sufficiently resistant to a disc fault such as a defective wobble configuration and an ADIP error due to dust and dirt adhering to the disc surface.

Problems, structures and effects other than those described above will become apparent from the following description of embodiments.

BRIEF DESCRIPTION OF THE DRAWINGS

FIGS. 11A to 11E are views explaining the structure of data including an error correction code and the wobble waveform generation process;

FIGS. 12A to 12E are views explaining the structure of data including the error correction code and the wobble waveform generation process when the data is partly re-arranged;

FIGS. 14A to 14E are views explaining the data structure and the wobble waveform generation process when the recording area is divided into zones;

DESCRIPTION OF EMBODIMENTS

Figure 2:
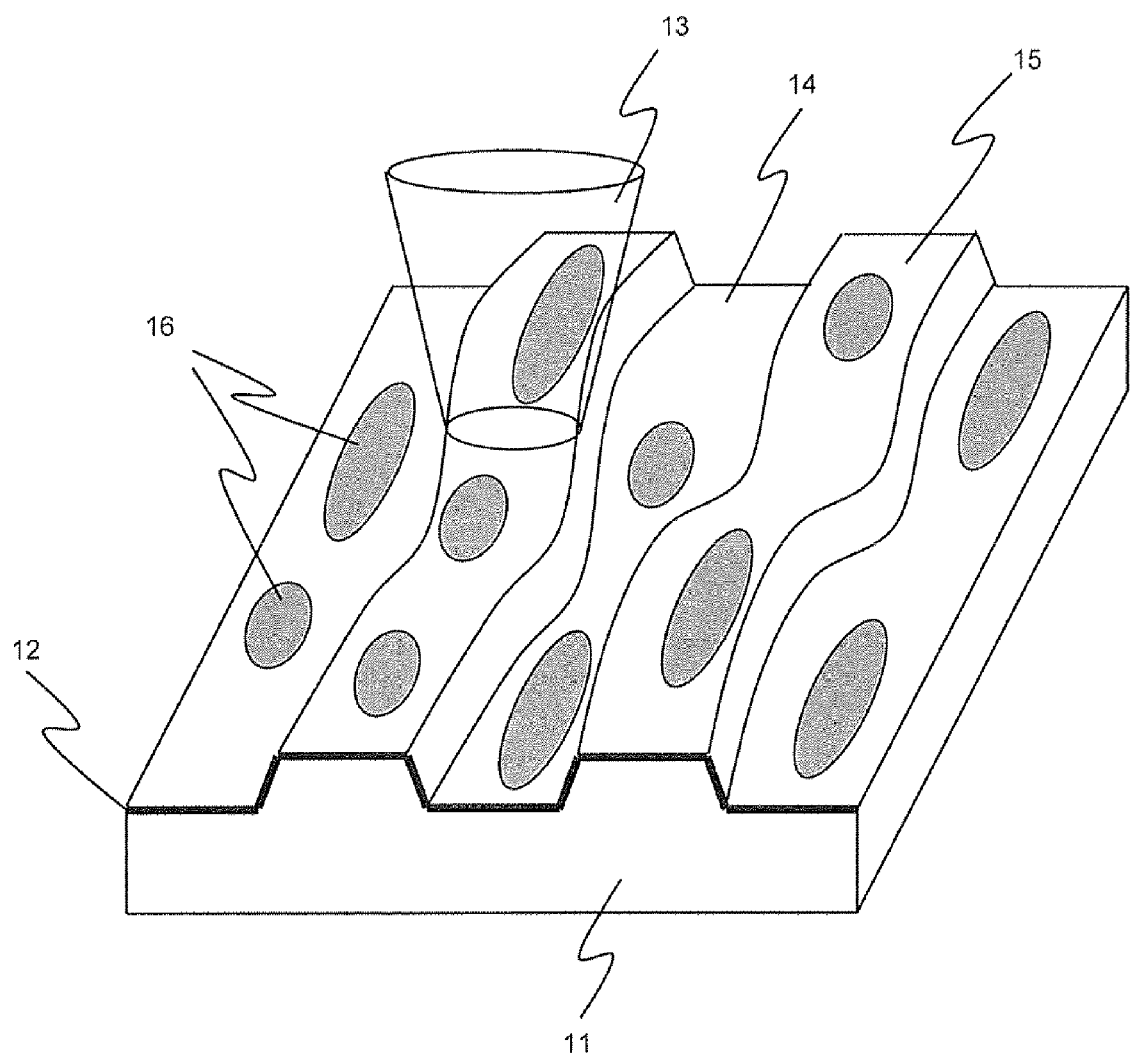
FIG. 2 is a view explaining the arrangement of recording marks according to the land-groove method.

First, the land-groove method will be described again. FIG. 2 is a view explaining the arrangement of recording marks 16 according to the land-groove method. On a disc substrate 11, a flat-bottom groove, that is, a groove 14 as shown in FIG. 2 is formed. The groove is formed of a uniform pitch spiral. As mentioned previously, the groove is wobbled. The substrate surface divided by the uniform pitch spiral groove will be referred to as a land 15. While the land and the groove are defined in various manners, in this specification, an area that is concave when viewed from the light incident surface is defined as the groove, and an area that is convex is defined as the land. On the land and the groove, a recording layer 12 is formed, and recording and reproduction of the recording marks 16 are performed by an optical spot 13. Since a recording mark stream is formed along each of the land and the groove, they will also be referred to as a land track and a groove track so as to indicate that they are recording areas. Although not shown for simplicity, a cover layer is provided on the recording layer.

<CAV Format>

Figure 3:
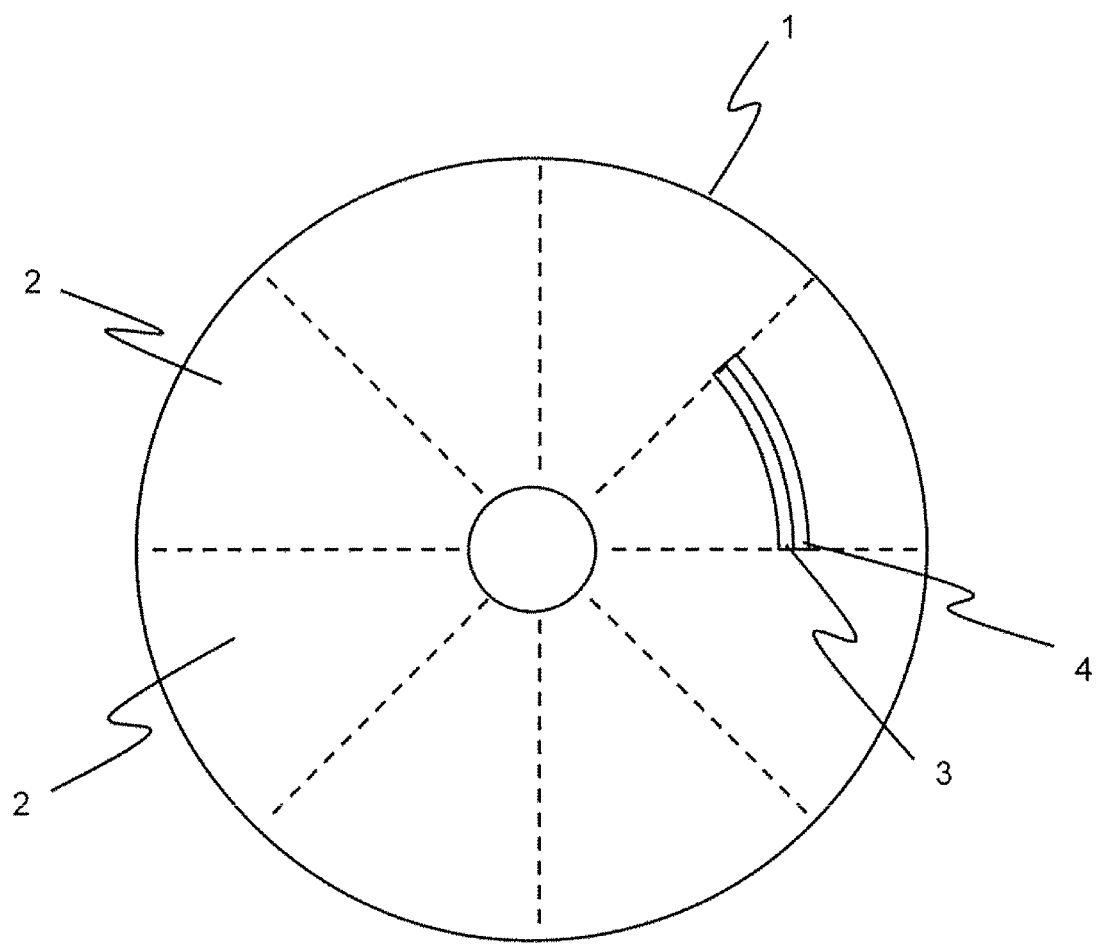
FIG. 3 is an explanatory view of an optical disc based on the invention.

Next, an embodiment will be described. FIG. 3 shows an explanatory view of an optical disc based on the invention. The groove is formed so as to draw a uniform pitch spiral on an optical disc 1. Here, in the figure, the drawing of the groove is omitted for simplicity. One rounds of the groove track and the land track are each constituted by eight segments 2. The segments are assigned numbers 0 to 7, respectively. The segments include a groove segment 3 formed of the groove track and a land segment 4 formed of the land track. The angles of the segments are the same.

The groove segments have the same format. The wobble configuration of a groove segment is determined by this format and the information recorded on the wobble. These are the same with the land segments. Since the configurations of the two side walls constituting the groove can be independently controlled by using electron beam drawing or the like, it is possible to arbitrarily control the configuration of the land instead of the groove. However, since the adjoining land and groove share the same side wall and it is impossible to completely independently form them, there is a slight difference in physical structure between the groove segments and the land segments as described later. Moreover, the wobble cycles included in one segment are all the same. Therefore, even though the lengths of the circumferences are different, the wobble cycles included in one track are also the same. Since the number of segments is eight, the phases of the wobble are the same in the radial direction except in a modulated part, so that the wobble interference between the adjoining tracks does not occur in the unmodulated section. A wobble format such that the wobble cycles included in one track are the same even though the lengths of the circumferences of the tracks are different as described above will be referred to as constant angular format.

The user data is necessarily recorded in a desired position in the recording area, and in doing so, the groove segments and the land segments are used as position targets. Therefore, it is necessary that these be discriminated uniquely. That is, it is necessary to assign an address by using a configuration readable by an optical method, or the like. General address components include the recording layer number (when there is more than one recording layer), the zone number (when there is a zone), the segment number, the land-groove discrimination bit (unnecessary when discrimination is performed only by the code of a track error signal) and the track number. Moreover, auxiliary information is recorded together with these. The contents of the auxiliary information are information specific to the pertinent disc, and the like which are recorded by using the auxiliary information recording areas of a plurality of segments. The above information is recorded as a configuration on the disc surface as a modulation of the wobble waveform after coded as required.

FIGS. 4A to 4D are views explaining the data structure and the wobble waveform generation process. With reference to FIGS. 4A to 4D by using as an example the disc of the structure shown in FIG. 3, the wobble waveform data preparation process by the above procedure will be described. Since no zone is set on the disc of the structure shown in FIG. 3, the data recorded on the wobble and the information amount thereof are as shown below in the order of arrangement. In the following, unless otherwise specified or except in the case of being contextually apparent, the name ADIP data or merely data refers to the data of the following contents recorded on the wobble: the recording layer number 101 (four bits); the segment number 102 (four bits); the track number 103 (19 bits); the land-groove discrimination bit 104 (one bit); and the auxiliary information 105 (eight bits). Here, as the track number, the land track and the groove track adjoining it on the outer side thereof are assigned the same value. Moreover, the difference between the track number of the land track and the track number of the groove track adjoining on the inner side thereof is one. As the value of the land-groove discrimination bit, 0 is assigned to the land track, and 1 is assigned to the groove track. Therefore, if the land groove discrimination bit is regarded as the least significant bit of the track number, the difference between the binary values of the adjoining track numbers is one. And regarding the land-groove discrimination bit as the least significant bit of the track number, the land-groove discrimination bit that is converted into a Gray code will be referred to as a Gray coded track number 106. Here, the pieces of data are arranged in the order such that items where the difference between the corresponding data of the adjoining track and the Hamming distance is expected to be smaller precede. That is, the recording layer number and the segment number have the same value as those of the adjoining track (Hamming distance 0). The Hamming distance of the Gray coded track number between the adjoining tracks is 1. Since the auxiliary information takes a given binary value, the Hamming distance of this item between the adjoining tracks is 0 to 8.

Then, the modulated waveform of the wobble is determined. Here, for the items where the Hamming distance is 0 between the adjoining tracks, since there is no possibility that the wobble interference occurs, binary phase-shift keying (BPSK) where code discrimination is easy is used. That is, assignment is made to a phase modulated section 107. On the other hand, for the items where the Hamming distance is not less than 1 between the adjoining tracks, since the wobble interference occurs, assignment is made to an STW modulated section 108. As described later, the STW (saw-tooth wave) used in the STW modulated section has a characteristic that even under a condition where the wobble interference occurs, the degree thereof is extremely lower than BPSK and the like. Lastly, the wobble waveform to be actually formed is determined. At the head of the wobble waveform corresponding to one segment, a sync code wobble 109 to explicitly indicate the start of a segment is generated. Then, a phase modulated wobble part 110 generated corresponding to the phase modulated section is added behind the sync code wobble.

Figure 4:
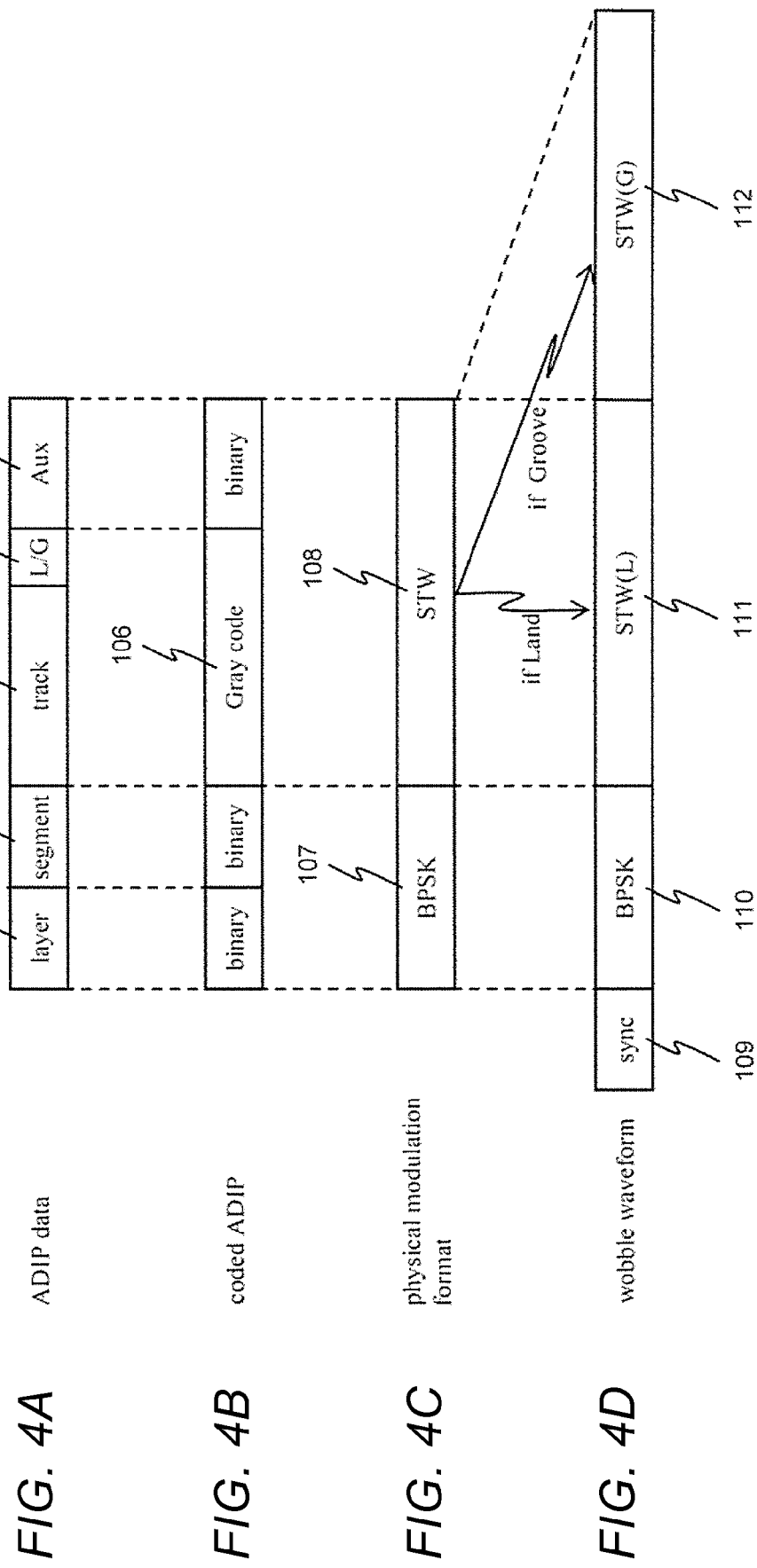
FIGS. 4A to 4D are views explaining the data structure and the wobble waveform generation process.

Then, the wobble waveform generated corresponding to the STW modulated section is added to the waveform generated before the above. As mentioned previously, since the land and the groove share the same side wall, for the section in which different pieces of data are held in the land segment and in the groove segment, as shown in FIG. 4D, dedicated areas, a land STW modulated wobble part 111 and a groove STW modulated wobble part 112, are provided for them, respectively. When the target segment is a land segment, the wobble waveform generated corresponding to the STW modulated section is added to the land STW modulated wobble part 111 immediately succeeding the phase modulated wobble part. At this time, data representing that this part is not used is put in the groove STW modulated wobble part 112. On the other hand, when the target segment is a groove segment, the wobble waveform generated corresponding to the STW modulated section is added to the groove STW modulated wobble part 112, and the data representing that this part is not used is put in the land STW modulated wobble part 111.

To actually form the wobble with an electron beam drawing apparatus, the configuration of either the groove or the land is drawn. It is assumed that the groove is drawn. Moreover, it is assumed that the track number increases from the inner circumference toward the outer circumference of the disc. At this time, when the sync code wobble part, the phase modulated wobble part and the groove STW modulated wobble part are drawn, of the pieces of data created above, the wobble waveform data of the pertinent groove segment is referred to, to draw the side wall configurations on both sides. On the other hand, in the land STW modulated wobble part, when the side wall on the inner side of the disc is drawn, the wobble waveform data corresponding to the immediately inside land segment is referred to, and when the side wall on the outer side is drawn, the wobble waveform data corresponding to the immediately outside land segment is referred to.

Figure 5:
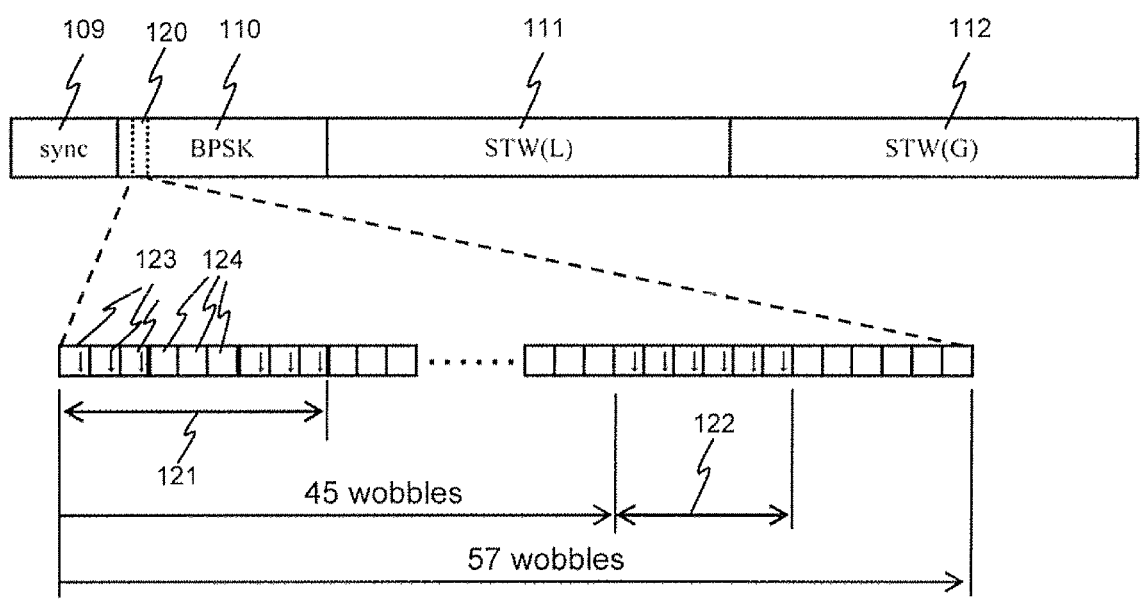
FIG. 5 is a view explaining the structures of a phase modulated wobble part and a phase modulated unit.

Next, the structure of each wobble part will be described. FIG. 5 is a view explaining the structures of the phase modulated wobble part and the phase modulated unit. First, the structure of the phase modulated wobble part will be described based on FIG. 5. The phase modulated wobble part 110 is constituted by eight phase modulated units 120 corresponding to the amount of information that it holds, eight bits. The phase modulated units 120 each bear data of one bit. The length of the phase modulated units 120 is 57 wobbles cycles. Since the minimum length where the wobble waveform can have a meaning is one cycle (here, the unit of the wobble length is not the length of the arc but the angle), in the following, one wobble cycle will be referred to merely as wobble. Moreover, the waveforms of various wobbles defined later are defined in units of wobbles, and will be referred to as, for example, names with prefixes representative of the kind like carrier wobble (obviously, the length is implicitly one wobble).

The structure of the phase modulated unit 120 will be described. The phase modulated unit 120 starts from a phase sync 121. This is a waveform with a length of nine wobbles representative of the start of the phase modulated unit 120. That is, after a $\pi$ wobble 123 continues for three wobbles, a carrier wobble 124 continues for three wobbles, and then, the $\pi$ wobble 123 continues for three wobbles. Here, the carrier wobble 124 is a waveform corresponding to the carrier of the wobble signal reproduced from the pertinent disc, and is a sinusoidal wave. That is, it serves as the reference of the frequency and phase of the wobbles of the kinds other than the carrier wobble. Moreover, it also has a role in representing bit 0 by being used in a specific position of the phase modulated unit 120 as described later. The waveform of the $\pi$ wobble 123 is a sinusoidal wave the phase of which is different by $\pi$ radian from that of the carrier wobble 124.

The phase sync 121 is succeeded by a part where the carrier wobble continues for 36 wobbles. This is for ensuring stable clock generation which is one of the important roles of the wobble by preparing a sufficiently long carrier wobble.

The six wobbles succeeding the part where the carrier wobble continues are a phase modulated data part 122 which is a part holding the data represented by the pertinent phase modulated unit. That is, when the waveforms of this part are all carrier wobbles, the data held by the pertinent phase modulated unit is 0. On the other hand, when the waveforms of this part are all π wobbles, the data held by the pertinent phase modulated unit 120 is 1. The phase modulated unit 120 is terminated by six wobbles of carrier wobble succeeding the phase modulated data part 122.

Figure 6:
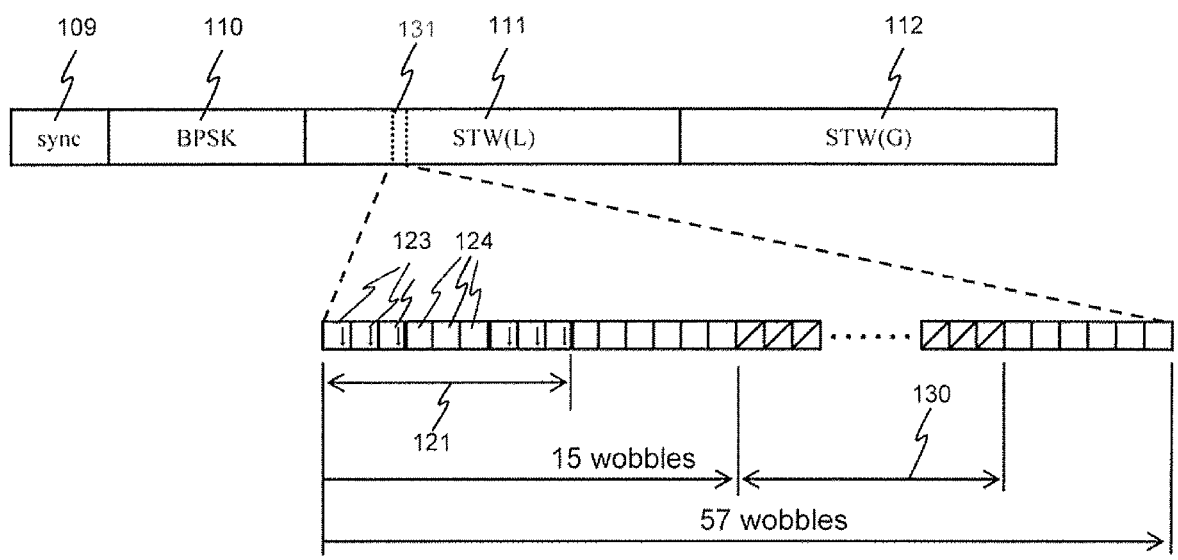
FIG. 6 is a view explaining the structures of an STW modulated wobble part and an STW modulated unit.

FIG. 6 is a view explaining the structures of the STW modulated wobble part and the STW modulated unit. Referring to FIG. 6, the structures of the land STW modulated wobble part 111 and the groove STW modulated wobble part 112 will be described. The structures of the land STW modulated wobble part 111 and the groove STW modulated wobble part 112 are the same. The land and groove STW modulated wobble parts are constituted by 28 STW modulated units 131. One STW modulated unit 131 holds one bit of data.

The structure of the STW modulated unit 131 will be described. The STW modulated unit 131 starts from the phase sync 121. This is the same as that used to represent the start of the phase modulated unit 120. That is, after the π wobble 123 continues for three wobbles, the carrier wobble 124 continues for three wobbles, and then, the π wobble continues for three wobbles. After the phase sync, the carrier wobble continues for six wobbles. The 36 wobbles succeeding this are an STW modulated data part 130 which is a part holding the data represented by the pertinent STW modulated unit. For the STW modulated data part 130, two kinds of waveforms are used corresponding to the data bit to be held.

That is, when the waveforms of this part are all NSTWs (negative STWs), the data held by the pertinent STW modulated unit 131 is 0. On the other hand, when the waveforms of this part are all PSTWs (positive STWs), the data held by the pertinent STW modulated unit 131 is 1. Here, the waveforms of the PSTW and the NSTW are the carrier wobble to or from which a sinusoidal wave having a frequency which is the integral multiple of the carrier wobble is added or subtracted, and are given by an expression (1) and an expression (2), respectively.

$$a_0 \cos\omega_w t + \sum_{n=2} b_n \sin n\omega_w t \tag{1}$$

$$a_0 \cos\omega_w t + \sum_{n=2} (-1)^{n-1} b_n \sin n\omega_w t \tag{2}$$

Here, the coefficients $a_0$ and $b_n$ are determined in accordance with a desired waveform. An example in which the coefficients are determined in consideration of the easiness of modulation is shown by an expression (3) (PSTW) and an expression (4) (NSTW).

$$A \cos\omega_t + \frac{A}{4}\sin 2\omega_w t \tag{3}$$

$$A \cos\omega_w t - \frac{A}{4}\sin 2\omega_w t \tag{4}$$

Here, A and $\omega_w$ are the amplitude and the angular frequency of the carrier wobble signal, respectively.

Figure 7:
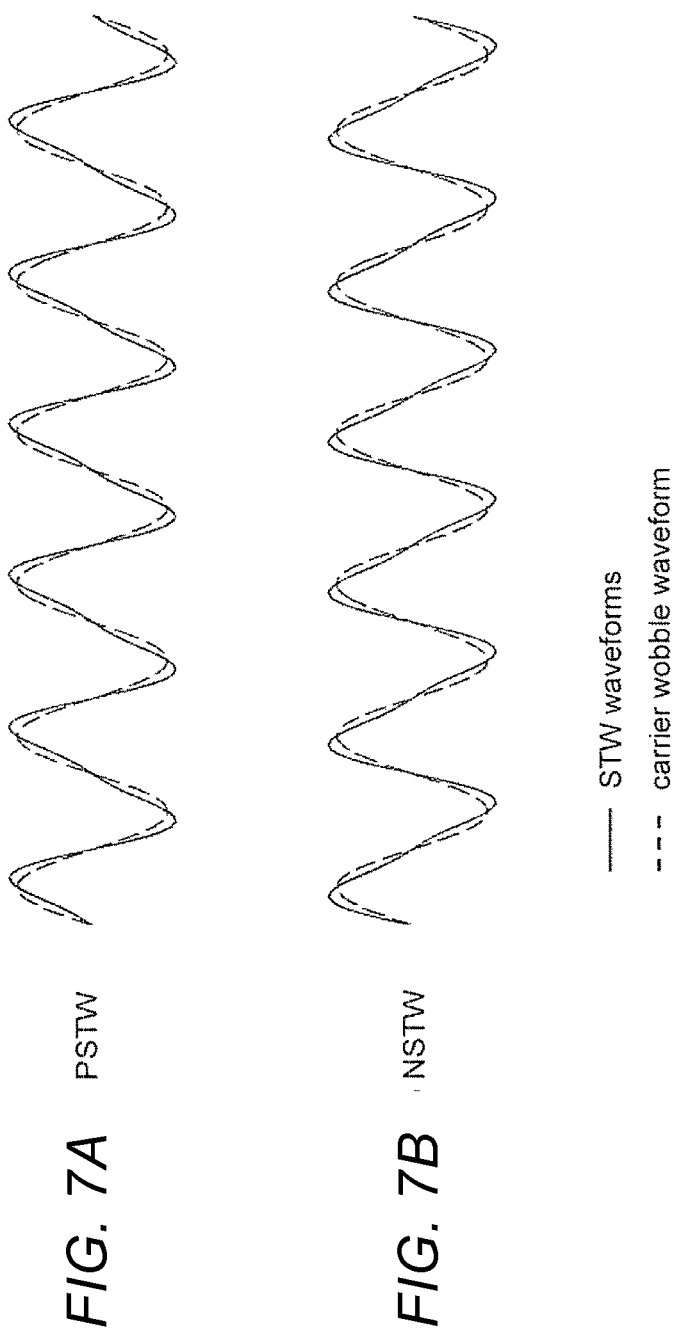
FIGS. 7A and 7B are views showing examples of the waveforms of a PSTW and an NSTW, respectively.

FIG. 7A and FIG. 7B show examples of the waveforms of the PSTW and the NSTW, respectively. As is apparent from the expression (3), the expression (4) and FIGS. 7A and 7B, since the illustrated STW is the carrier wobble to or from which the sinusoidal wave of a frequency twice that of the carrier wobble is added or subtracted, the carrier can be easily extracted also from the STW modulated data part.

The STW modulated unit is terminated by six wobbles of carrier wobble succeeding the STW modulated data part.

Figure 1:
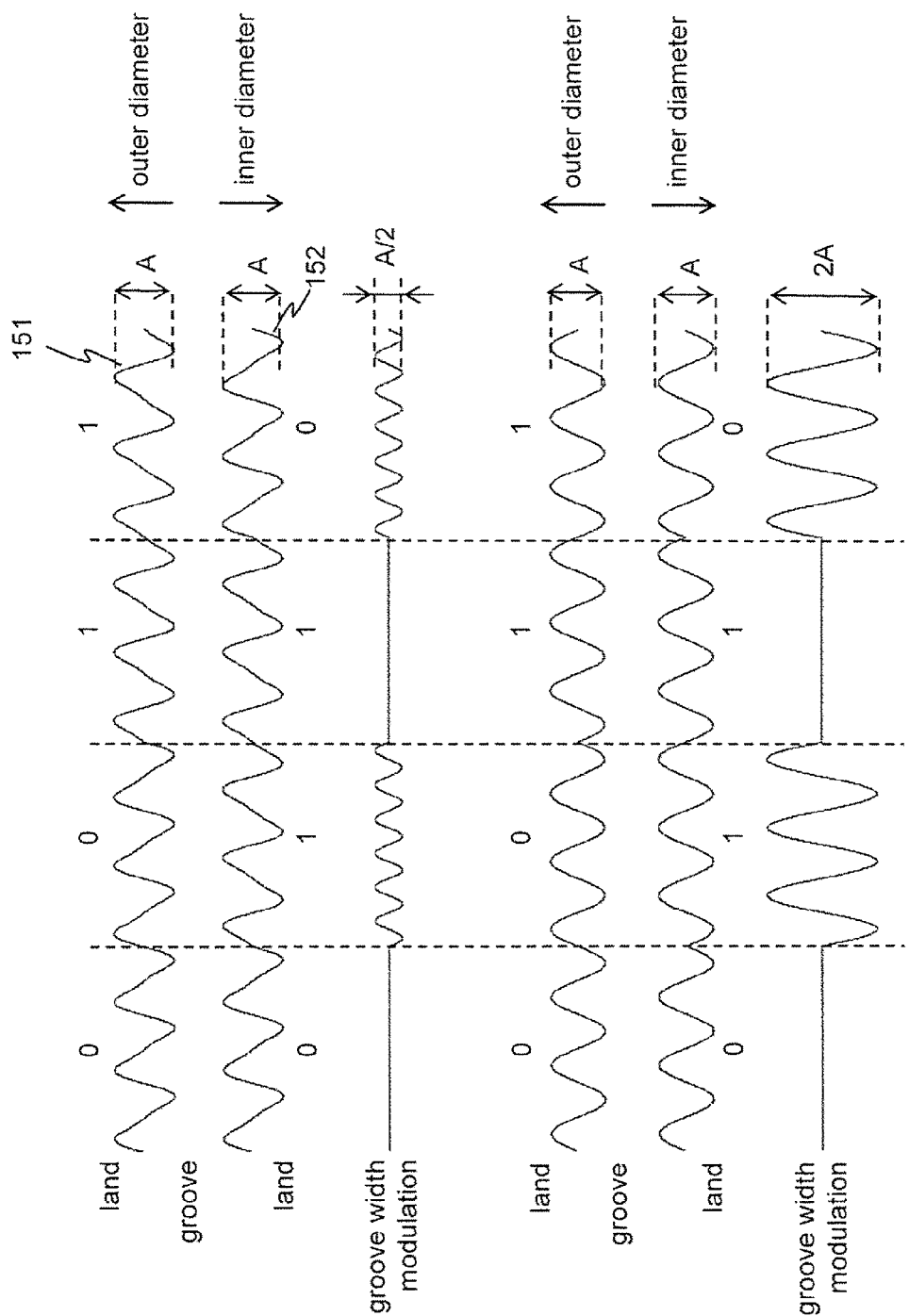
FIGS. 1A and 1B are views showing an example embodying the invention.

Now, the reason that even under the condition where the STW causes the wobble interference, the degree thereof is extremely lower than BPSK and the like will be described with reference to FIGS. 1A and 1B. FIGS. 1A and 1B are schematic diagrams explaining the state of the wobble interference in the groove using the STW and the BPSK modulation. In FIG. 1A, only the part of the modulated waveform is extracted while the structure of the STW modulated unit and the like is simplified for simplicity. The object to be examined is the land STW modulated part ill of the groove track. Moreover, the upper parts and the lower parts of FIGS. 1A and 1B show the outer side and the inner side of the disc, respectively. The upper curved line of FIG. 1A represents a groove outer side wall 151 (the side wall on the outer side of the groove), and the numeral 0 or 1 shown in the vicinity thereof represents the data held by the STW modulated unit of the land track adjoining on the outer side of the pertinent groove. The lower curved line of FIG. 1A represents a groove inner side wall 152 (the side wall on the inner side of the groove), and the numeral 0 or 1 shown in the vicinity thereof represents the data held by the STW modulated unit of the land track adjoining on the inner side of the pertinent groove. The configurations of the groove outer side wall 151 and the groove inner side wall 152 are the NSTW when the data held by the STW modulated units corresponding thereto is 0, and are the PSTW when the data is 1. The lowermost curved line of FIG. 1A represents changes of the width of the pertinent groove. That is, when the data of the inner side land and the data of the outer side land are the same, the change of the groove width is zero. On the other hand, when the data of the inner side land and the data of the outer side land are not the same, the groove width changes according to the following expression (5) as is apparent from the expressions (3) and (4).

$$\pm \frac{A}{2}\sin 2\omega_w t \tag{5}$$

FIG. 1B is a view explaining how the groove width changes when the BPSK is used as the modulated waveform under the same condition as that in FIG. 1A. The structure of the phase modulated unit and the like is simplified and only the part of the modulated waveform is extracted. A case is considered in which the BPSK waveform is used instead of the STW in a part corresponding to the land STW modulated part of the groove track. In this case, under a condition where the data of the inner side land and the data of the outer side land are not the same, the groove width changes according to the following expression (6).

$$2A \cos\omega_w t \tag{6}$$

That is, even under a condition where the configurations of the side walls on both sides of the groove are not the same and the groove width modulation is unavoidable, by using the STW modulation as the wobble modulation, the amplitude of the groove width modulation can be suppressed to a quarter of that when the BPSK modulation is used. While the groove is used as an example in FIGS. 1A and 1B and in the description given above, since it is apparent that circumstances are the same with the modulation of the land width, a description thereof is omitted. In the following, the amplitude of the track width modulation due to the wobble interference will be referred to as wobble interference amplitude.

Figure 8:
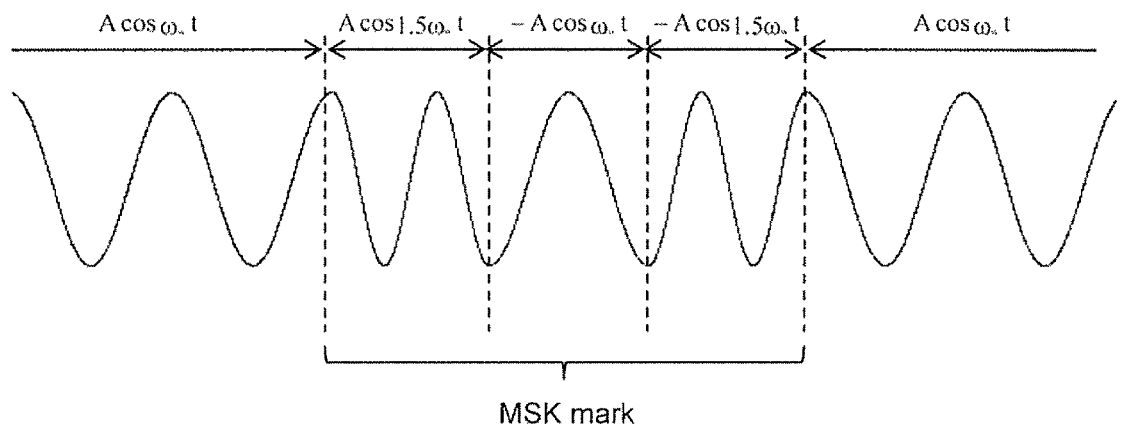
FIG. 8 is an explanatory view of an MSK mark.

Next, the structure of the sync code wobble part will be described. The sync code wobble part has roles in explicitly indicating the start of a segment and deriving a precise angular position of the optical spot. For this reason, although it does not hold data unlike the other wobble parts, it is a waveform where the start of a segment is easy to discriminate and the precise angular position of the optical spot is easy to determine. For this reason, for the sync code wobble part, a waveform called MSK (minimum shift keying) mark 140 not used for the other wobble parts is used. FIG. 8 is an explanatory view of the MSK mark. As shown in FIG. 8, a group of three wobbles constitutes one MSK mark. That is, although the central wobble is a sinusoidal wave the phase of which is reversed with respect to the carrier wobble, the preceding and succeeding one wobbles are each a sinusoidal wave where the frequency is 1.5 times although the phase is continuous, and smoothly connect with the carrier wobble. This has a characteristic that although it is a kind of bi-phase modulation, since the central wobble the phase of which is reversed and the carrier wobble smoothly connect with each other, the spread of the spectrum in this part is significantly smaller than that of the BPSK and the like and for this reason, the observed fluctuations of the amplitude of the wobble signal are also small. Moreover, since the section where the phase is reversed is limited to one wobble, by detecting the MSK mark, the position can be determined to a precision of within one wobble. The characteristics of the MSK mark will not be described in more detail since they are disclosed in Jpn. J. Appl. Phys., Vol 42 (2003) pp 915-918 (Non-Patent Document 2).

Figure 9:
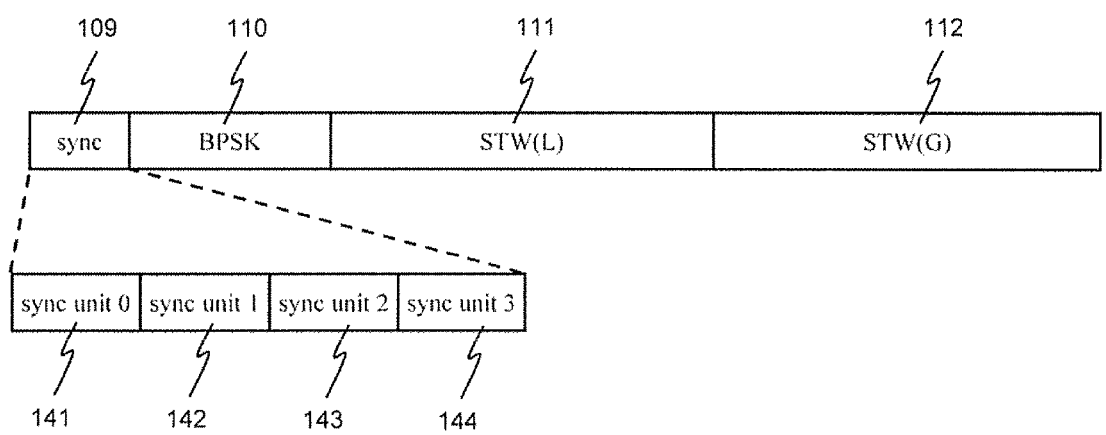
FIG. 9 is a view explaining the structure of a sync code wobble part.

FIG. 9 is a view explaining the structure of the sync code wobble part. The sync code wobble part is formed of four kinds of sync code units (a sync code unit 0 141, a sync code unit 1 142, a sync code unit 2 143, a sync code unit 3 144) arranged in order. Since each sync code unit has a specific sync code (MSK mark appearance pattern), even when some of the sync codes cannot be detected for some reason, it is easy to estimate the position from the detected sync codes. The length of all the sync code units is 57 wobbles.

Figure 10:
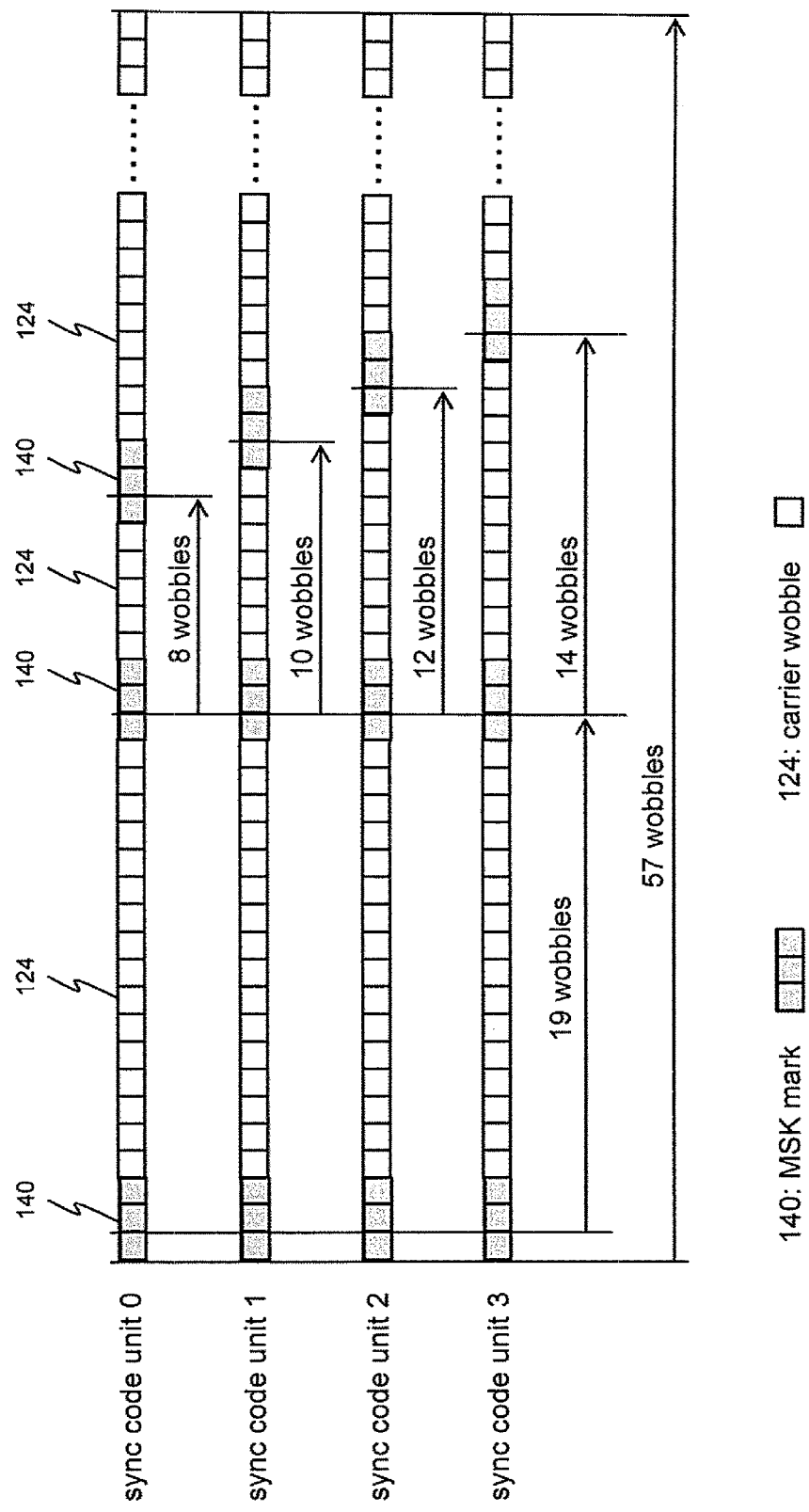
FIG. 10 is a view explaining the structure of sync code units.

FIG. 10 is a view showing the structure of the sync code units. The sync code units each start at an MSK mark, and the center of the second MSK mark appears 19 wobbles away from the center of the first MSK mark. The MSK marks are detected by discriminating the wobble the phase of which is reversed with respect to the carrier wobble, that is, the central wobble. That is, when the second MSK mark is detected after the passage of 19 wobble clocks from the detection of the first MSK mark, detection of the sync code can be determined. The distance from when the first MSK mark is detected to when the second MSK mark is detected as described above will be referred to as distance between MSK marks.

For the discrimination between sync codes, the distance between the second MSK mark and the third MSK mark is used. That is, as shown in FIG. 10, the distances between MSK marks at the sync code units 0 to 3 are 8, 10, 12 and 14, respectively.

<ECC Addition>

In the above embodiment, data is not converted into an error correction code. Therefore, although the influence of the wobble interference is reduced, vulnerability still exists to a disc fault such as a defective wobble configuration and dust and dirt adhering to the disc surface. FIGS. 11A to 11E explain a wobble waveform generation procedure when data is protected by the error correction code under the same condition as that in the above-described embodiment.

The process from the ADIP data of FIG. 11A to the preparation of the Gray coded track number of FIG. 11B is the same as that described with reference to FIGS. 4A to 4D. A parity 100 is added at the process of FIG. 11C. In this embodiment, with the recording layer number of four bits, the segment number of four bits, the track number of 19 bits, the land-groove discrimination of one bit and the auxiliary information of eight bits in this order of appearance, seven symbols with a length of four bits were formed, and based on these, a systematic Reed-Solomon code was generated. That is, it was formed on a Galois extension field GF ($2^4$). The parity 100 generated in this case is eight symbols (32 bits). Thus, since the code-word length of this code is 15 symbols and the data is seven symbols, the minimum code distance is nine.

Since data is converted into the systematic code, FIG. 11C obtained in the above is FIG. 4B to which simply parity is added. Therefore, as shown in FIG. 11D, the wobble modulated waveform is generated in the same manner as that in the case of FIG. 4C. That is, since the recording layer number and the segment number have the same value as the adjoining track and do not cause wobble modulation, modulation is performed by BPSK, and the phase modulated section 107 is generated. Since the Gray coded track number, the auxiliary information and the parity always have a part where wobble interference occurs, modulation is performed by STW, and the STW modulated section 108 is generated. Based on the wobble modulated waveform determined in the above, the sidewall configuration of the wobble can be determined in the same manner as that in the case of FIG. 4D. In doing so, as the sync code wobble part added to the head, the same one as that in the case of FIG. 4D is used.

As is apparent from FIGS. 11C and 11D, the first half of the STW modulated section is the Gray coded track number. Therefore, as described previously, in a part, derived from the first half of the STW modulated section, of the land STW modulated wobble part and the groove STW modulated wobble part, the Hamming distance between the adjoining tracks is merely 2. That is, the frequency of the wobble interference is twice for 20 bits of data. On the other hand, it is the auxiliary information and the parity that constitute the latter half of the STW modulated section. Since these are generally random binary codes, for the land STW modulated wobble part and the groove STW modulated wobble part derived from this part, the Hamming distance between the adjoining tracks is 20 on average. That is, the frequency of the wobble interference is 20 times on average for 40 bits of data. Although the degree of the wobble interference is significantly suppressed by the STW modulation, continuous appearance of the STW modulated unit that causes the wobble interference can be a problem in some phases.

FIGS. 12A to 12E are views explaining the structure of the data including the error correction code and the wobble waveform generation process when the data is partly re-arranged. To reduce the continuous appearance of the wobble interference described above, a method is available in which interleaving is performed, that is, the data arrangement is changed prior to the generation of the wobble waveform as shown in FIGS. 12A to 12E. FIG. 12A corresponds to a condition where parity is added to the data, that is, FIG. 11C. The Gray coded track number 106 is divided into two parts of the same length, a Gray code higher order part 132 and a Gray code lower order part 133. Moreover, regarding the auxiliary information 105 and the parity 100 as one piece of data, this is also divided into two parts of the same length, a binary higher order part 134 and a binary lower order part 135. Then, the order of appearance of these is changed. That is, it is changed to the order of the Gray code higher order part 132, the binary higher order part 134, the Gray code lower order part 133 and the binary lower order part 135. The processing performed thereafter is the same as FIG. 11D and succeeding process. By the processing of interleaving part of the wobble waveform in the section modulated by a waveform with a small wobble interference amplitude and part of the wobble waveform in the section modulated by a waveform with a large wobble interference amplitude, even when the STW modulated unit that causes wobble interference continues, at least the length thereof can be suppressed.

<Zone>

In the embodiment described above, only the recording area of the disc is divided into segments of the same angle as shown in FIG. 3. When the user data is recorded onto such a disc, if recording is performed with the channel clock frequency being fixed to a constant multiple of the wobble clock frequency, the linear recording density significantly differs according to the radial position on the disc. For example, when the innermost perimeter and the outermost perimeter of the recording area are 24 mm and 58 mm, respectively, the linear recording density differs by 2.4 times at the maximum. Therefore, there is a problem in that even if recording is performed with a linear recording density as high as possible at the innermost perimeter, the average linear recording density in the entire recording area is considerably lower than that at the innermost perimeter.

Figure 13:
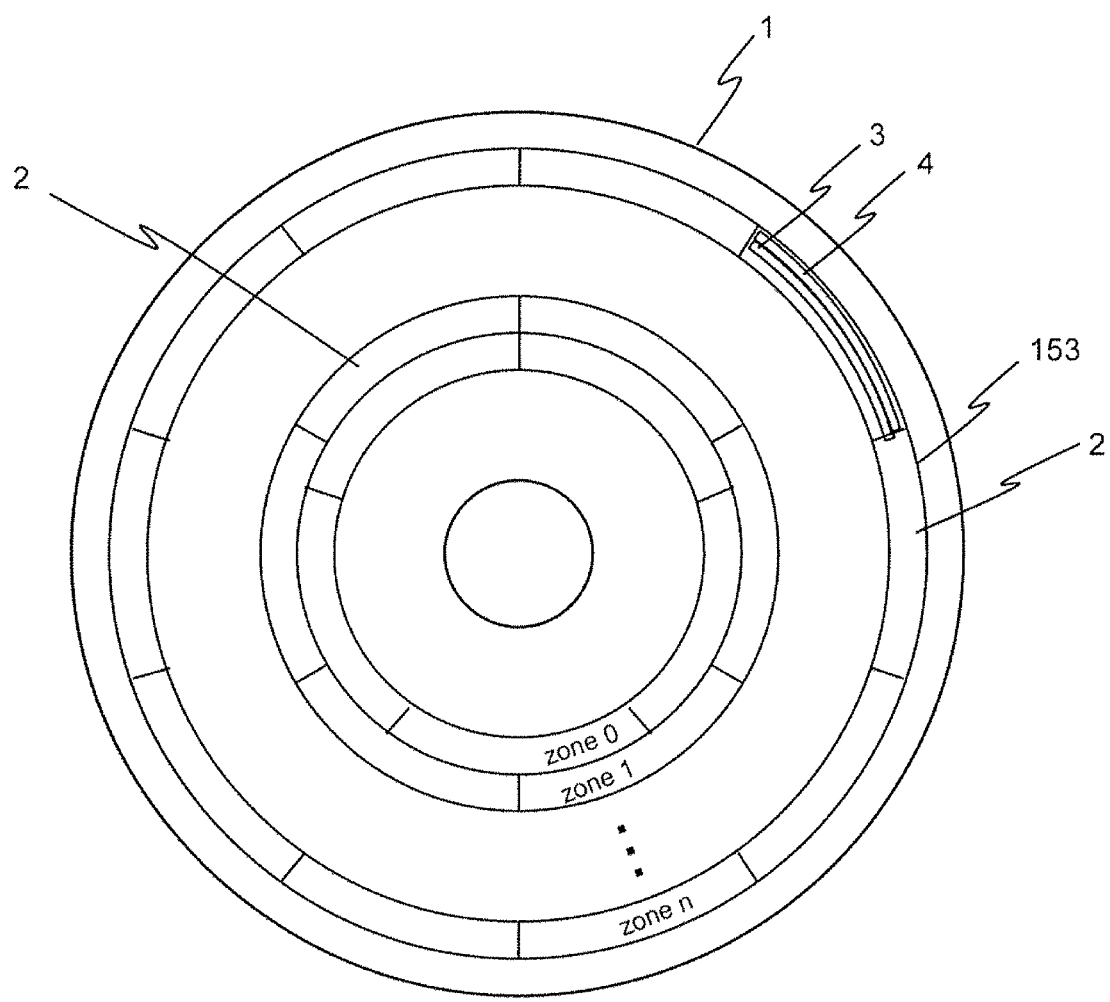
FIG. 13 is a schematic view when the recording area is divided into zones.

One method to solve this problem is to set zones as shown in FIG. 13. That is, the recording area is divided into a plurality of zones 153 in the radial direction, and the number of segments to be accommodated is set for each zone. That is, setting is made so that outer zones have more segments, and in each zone, recording is performed with the channel clock frequency being fixed to a constant multiple of the wobble clock frequency. As a result, the fluctuation range of the linear recording density is reduced and the average linear recording density can be increased. In this case, a different constant angular format is defined for each zone.

FIGS. 14A to 14E are views explaining the data structure and the wobble waveform generation process when the recording area is divided into zones. When the recording area is divided into zones, as shown in FIGS. 14A to 14E, it is necessary to change the ADIP data structure and the wobble modulated data generation process accordingly. That is, compared with FIG. 11A where no zone is provided, a zone number 154 with a length of four bits is newly disposed behind the layer number. Since the recording area is divided into zones, it is sufficient only that the track number can express the track number in the zone and therefore, reduction from 19 bits to 15 bits is made. Therefore, the length of the data is not changed. Since the zone number is held at a fixed value within the zone, the wobble interference caused by this part does not occur. For this reason, the zone number is assigned to the phase modulated section together with the layer number and the segment number.

<CLV Recording>

Figure 15:
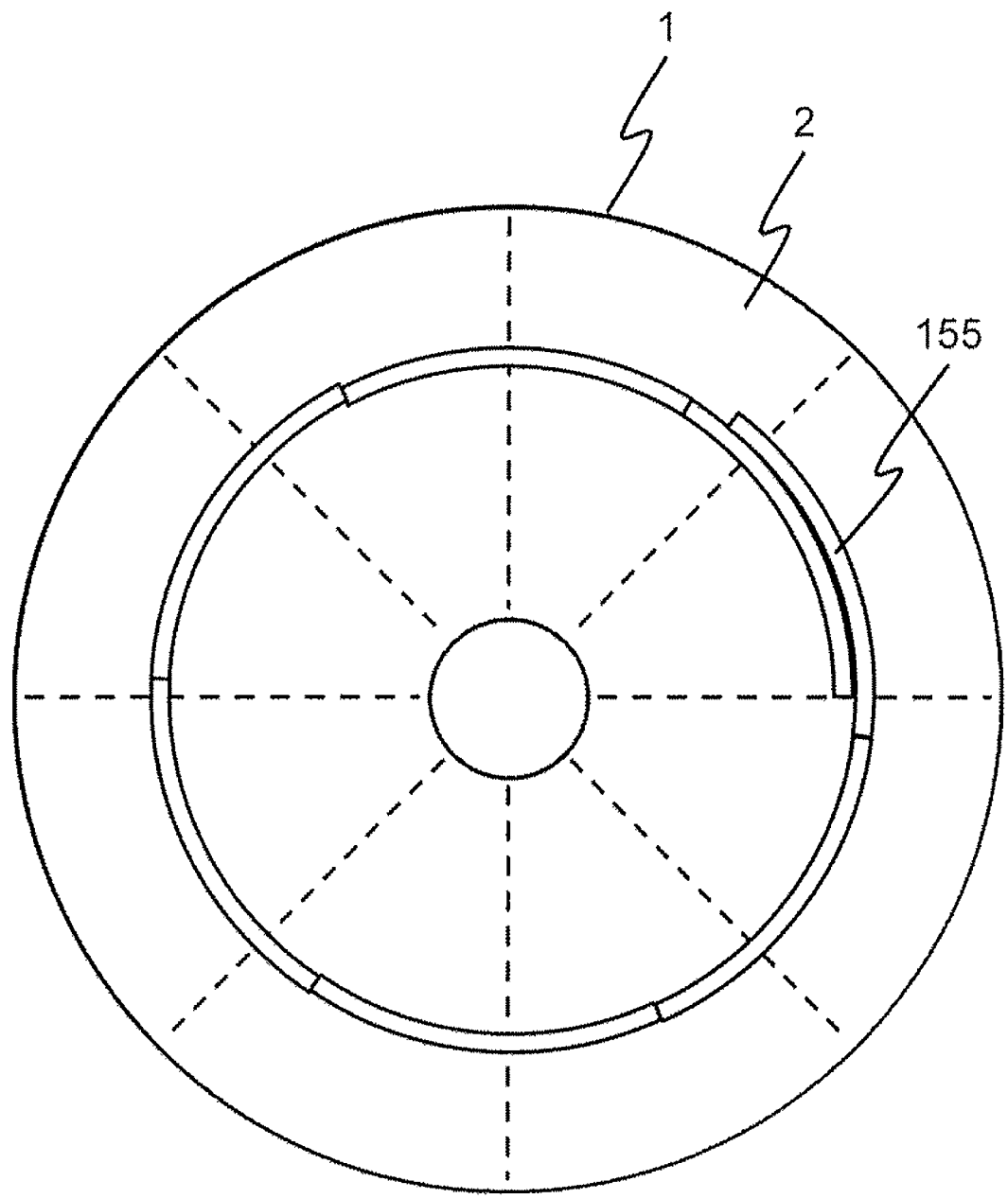
FIG. 15 is a schematic view of a RUB arrangement when recording is performed with a fixed linear recording density.

As another method to solve the above-mentioned problem, a method is available in which the user data is recorded with a constant linear recording density as shown in FIG. 15. In this case, since the position of the head of a RUB (recording unit block) 155 which is the recording unit of the user data is not synchronized with the head of the segment, it is necessary to calculate it for each RUB. For that, for example, a spiral length formula as disclosed in Standard ECMA-274 Appendix J (Non-Patent Document 3) is applied to obtain it.

<Parity Assembly Method>

Figure 16A:
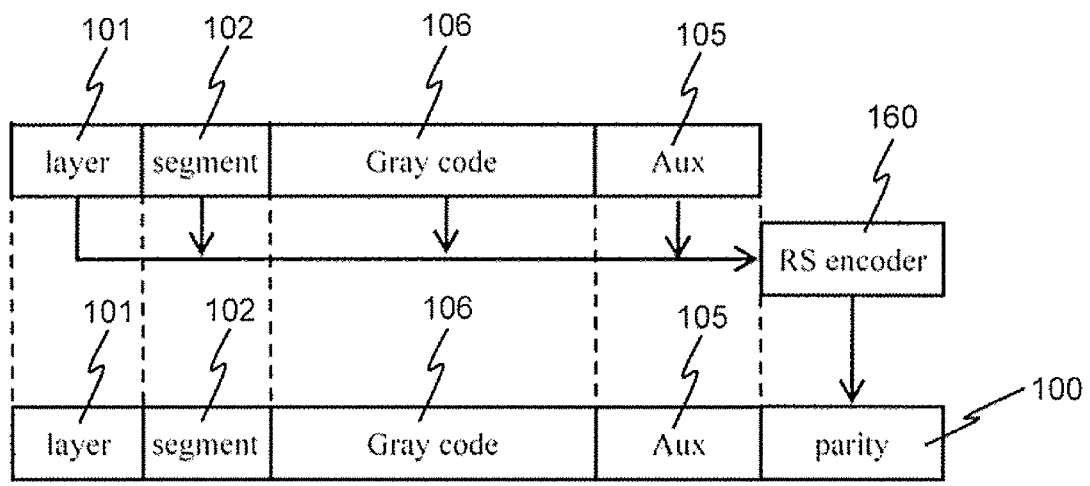
FIGS. 16A and 16B are views explaining the kind of the parity generation method.
Figure 16B:
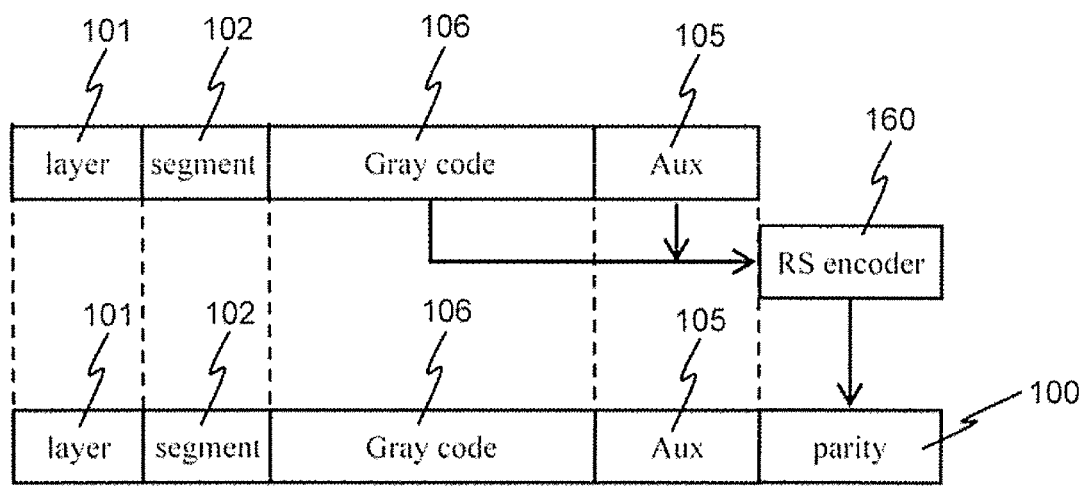

FIGS. 16A and 16B are views explaining the kind of the parity generation method. As described in the example of FIGS. 11A to 11E, the parity 100 is generated from the entire data as shown in FIG. 16A. Of the data, the layer number is set so that the same value repetitively appears as long as it remains in the same recording layer. Moreover, the segment number repeats a cycle such that it increases by one from 0 to the maximum value and returns to 0. A method is considered in which the same value repetitively appears like these or the value that appears according to a simple rule is not protected by the error correction code. Even if the bit error rate when these are reproduced is not sufficiently reliable, by reproducing sufficiently many segments under a condition where the same value is expected, sufficient reliability is obtained by adopting the most frequently appearing value. Moreover, it is easy to avoid the influence of a local error factor.

As a merit of generating the error parity without the layer number or the segment number being included as shown in FIG. 16B, first, the length of the auxiliary information can be increased without the length of the code word being changed. Alternatively, by increasing the parity without changing the length of the code word similarly, the code can be made more resistant to errors.

<Recording and Reproduction>

Figure 17:
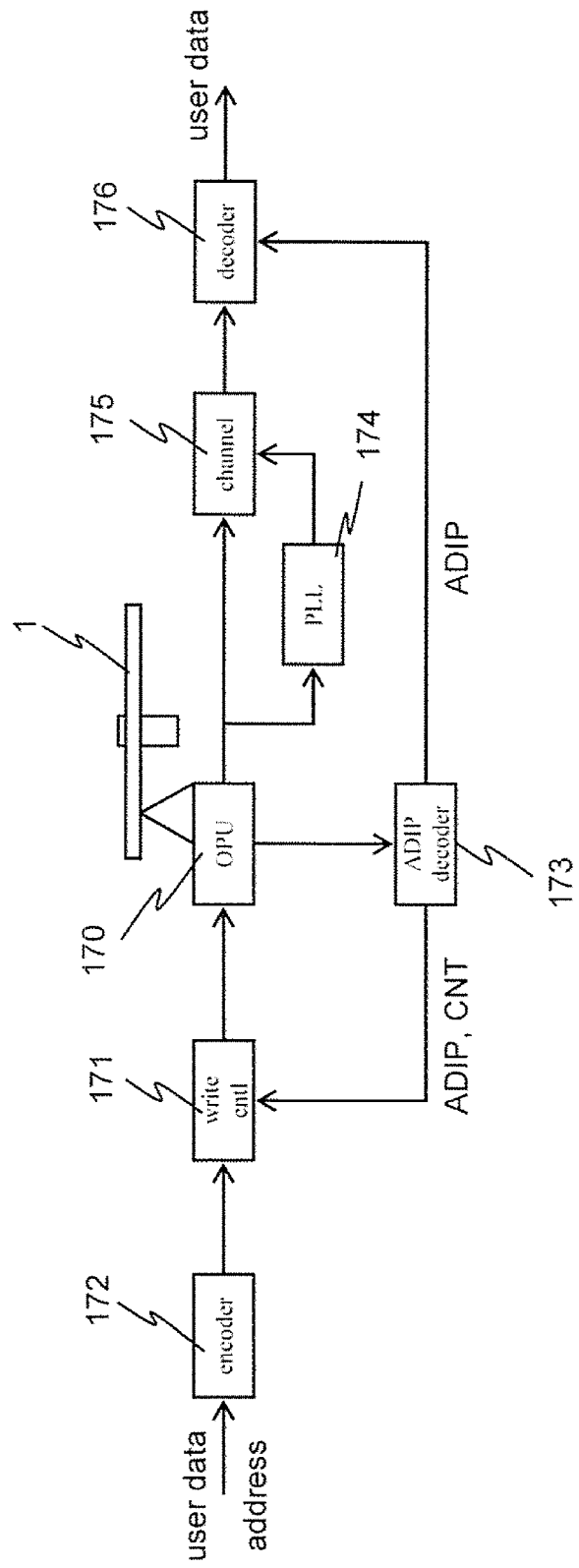
FIG. 17 is an explanatory view of the recording and reproduction operations.

FIG. 17 is a schematic view of a relevant part associated with recording and reproduction which part is extracted from an optical disc device. Using FIG. 17, the recording and reproduction operations will be described. First, the recording operation when the segment and the RUB are synchronized with each other will be described. The user data is inputted to a user data encoder 172 together with the address of the recording destination, and undergoes processes such as error correction code generation, interleaving and code modulation to organize a channel bit stream to be recorded as a RUB. The channel bit stream is sent to a write control 171. On the other hand, an optical pickup 170 is always outputting a wobble signal which is inputted to an ADIP decoder 173. The ADIP decoder 173 performs demodulation of the ADIP data and decoding of the error correction code from the wobble signal. The obtained data is always inputted to the write control 171, and the reproduced ADIP is always monitored. That is, it is confirmed that the ADIP where the optical spot is situated now is in front of the recording destination and the recording destination ADIP can be reached by following the current track, and while the value of the reproduced ADIP and the sync code are monitored, the recording start timing information is transmitted to the write control 171. When determining that the optical spot has reached the recording start position based on this timing information, the write control 171 transmits a recording light emission start instruction and waveform data to the optical pickup 170 and starts recording.

Figure 18:
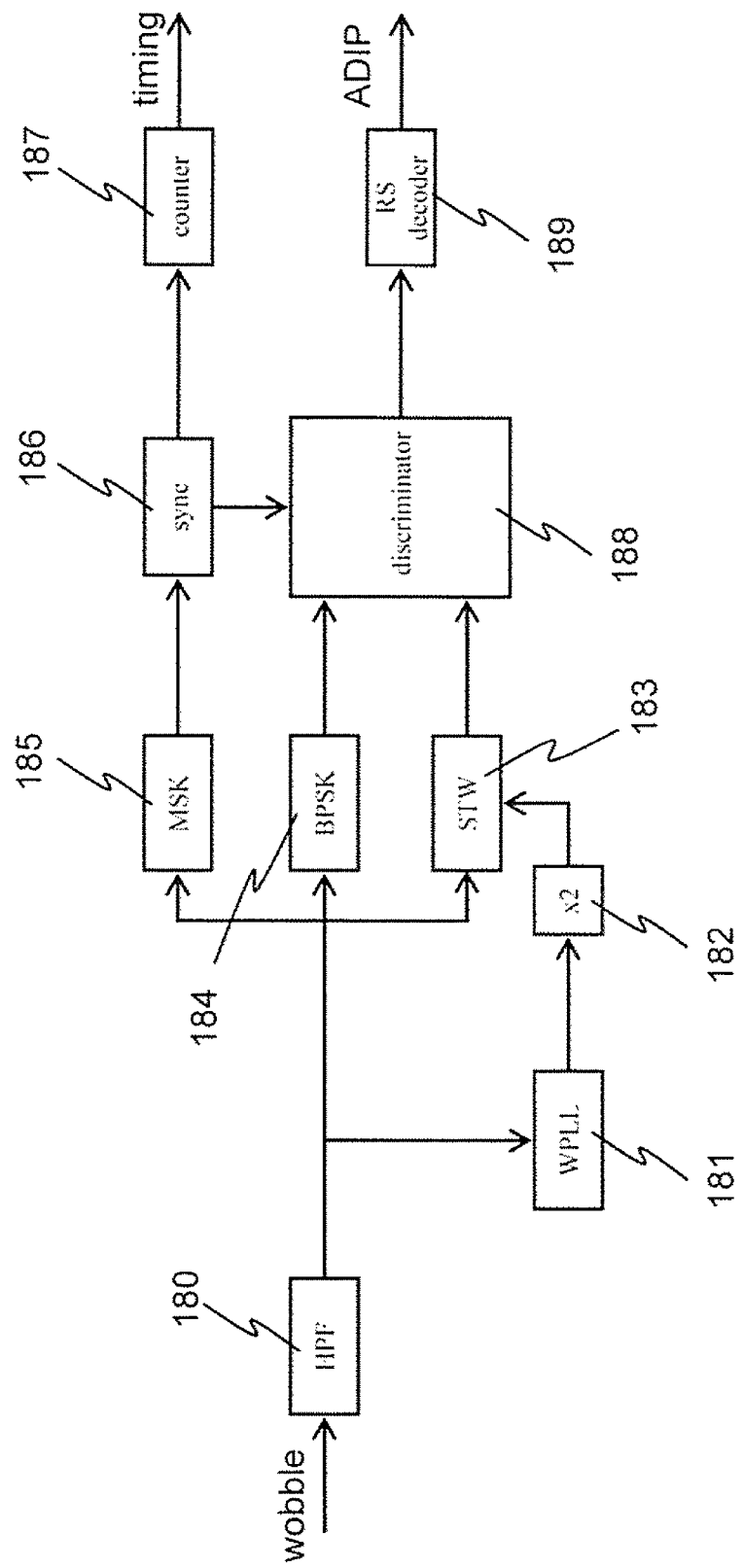
FIG. 18 is an explanatory view of an example of the structure of an ADIP decoder.

FIG. 18 is a view explaining the structure of the ADIP decoder. Since the wobble signal detected by the optical pickup contains a DC component and a low-frequency component, these are removed by a high pass filter 180. The wobble signal having passed through the high pass filter 180 is inputted to a wobble PLL 181 where a clock synchronized with the frequency and phase of the carrier of the wobble signal is reproduced. The reproduced clock is supplied to the elements driven by the wobble clock in the ADIP decoder. In the figure, the clock supply line is omitted for simplicity. However, since an STW demodulator 183 is necessarily driven by a clock of a frequency twice that of the wobble carrier, a clock that is frequency-doubled by a frequency doubler 182 is supplied.

The output of the high pass filter 180 is also inputted to an MSK detector 185, a BPSK demodulator 184 and an STW demodulator 183. These are demodulators conforming to the modulation methods, respectively. The MSK detector sends the appearance pattern of the MSK mark to a sync code detector 186. Comparing the pattern with the sync code, the sync code detector is capable of grasping, in units of wobbles, the time at which the optical spot passed the sync code. Therefore, by counting the number of wobbles after sync code passage by a wobble counter 187, the recording start timing signal can be issued at the head of the next segment. That is, by generating the recording start timing signal at the sync code of the immediately preceding segment after detecting the second preceding ADIP from the start of recording, recording can be performed in a desired segment.

The sync code detector 186 also notifies a discriminator 188 of the time at which the optical spot passed the sync code at the same time. Receiving the notification, the discriminator 188 counts the wobble clock by an internal counter, and after selecting an appropriate output of either the BPSK demodulator 184 or the STW demodulator 183 based on the structure of the ADIP word, the discriminator 188 discriminates the bit value of the data. The result of the discrimination is sent to a Reed-Solomon code decoder 189, and when pieces of data equivalent to an ADIP word are all obtained, the Reed-Solomon code is decoded to obtain ADIP data.

Next, using FIG. 17, the operation at the time of reproduction will be described. When an instruction to read the data of the specified address is received from the host, the position of the optical pickup 170 is moved approximately to a desired position. The optical pickup 170 is always outputting a wobble signal, and this is inputted to the ADIP decoder 173. The ADIP decoder performs demodulation of the ADIP data and decoding of the error correction code from the wobble signal. The obtained data is always monitored by firmware. The firmware confirms that the ADIP where the optical spot is situated now is in front of the target one and the ADIP corresponding to the address to be read can be reached by following the current track.

The reproduction signal output of the optical pickup 170 is supplied to a channel PLL 174 to reproduce the channel clock of the channel bit stream. The reproduction signal output of the optical pickup 170 is decoded into a bit stream by a read channel 175. The decoded bit stream undergoes frame structure analysis and error correction processing at a user data decoder 176 to obtain the user data. In that case, since the address of the recording destination is simultaneously obtained together with the user data, whether the association between this and the ADIP is correct or not is checked to thereby improve reliability.

Figure 19:
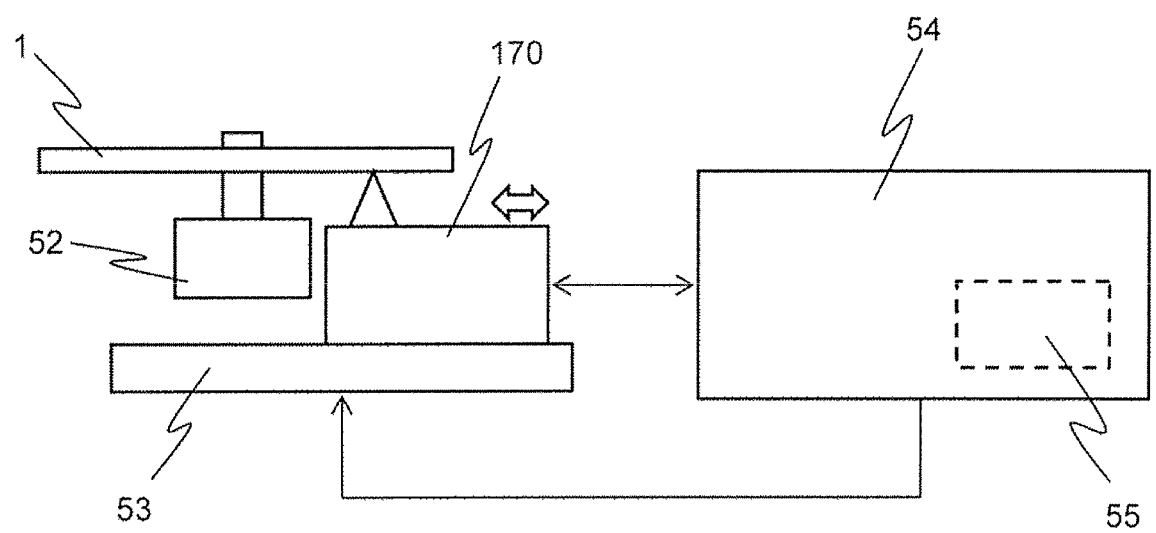
FIG. 19 is an explanatory view of an example of the structure of an optical disc device.

FIG. 19 shows an example of the structure of the optical disc device. An optical disc 1 is rotated by a spindle motor 52. The optical pickup 170 is constituted by a light source used for recording and reproduction, optical systems including an objective lens, and the like. The optical pickup 170 performs a seek by a slider 53. The seek, the rotation of the spindle motor and the like are performed according to an instruction from a main circuit 54. The main circuit 54 is provided with dedicated circuits such as a signal processing circuit and a feedback regulator, a microprocessor, a memory and the like. It is only firmware 55 that controls the overall operation of the optical disc device. The firmware 55 is stored in a memory in the main circuit 54.

The invention is not limited to the above-described embodiments, but embraces various modifications. For example, the above embodiments are described in detail to clearly explain the invention, and are not necessarily limited to ones provided with all the described structures. Moreover, some of the structures of an embodiment may be replaced with structures of another embodiment, and a structure of an embodiment may be added to the structures of another embodiment. Moreover, with respect to some of the structures of each embodiment, the addition, deletion or replacement of other structures may be performed.

What is claimed is:

1. An optical information recording medium having a constant angular wobble format,
    wherein a data type held by a wobble is classified and arranged based on a frequency of occurrence of a wobble interference, and
    for the data type where the frequency of occurrence of the wobble interference is not less than one, a waveform where an amplitude of the wobble interference is smaller than twice an amplitude of a carrier wobble is used as a wobble modulated waveform.

2. The optical information recording medium according to claim 1,
    wherein as the waveform where the amplitude of the wobble interference is smaller, a waveform that is the carrier wobble on which a harmonic of the carrier wobble is superimposed is used.

3. The optical information recording medium according to claim 1,
    wherein as the wobble modulated waveform of the data type where the frequency of occurrence of the wobble interference is zero, an MSK waveform is used, and
    as the waveform where the amplitude of the wobble interference is smaller, a waveform that is the carrier wobble on which a harmonic of the carrier wobble is superimposed is used.

4. The optical information recording medium according to claim 1,
    wherein the data is a systematic code.

5. The optical information recording medium according to claim 1,
    wherein part of a wobble waveform in a section modulated by the waveform where the amplitude of the wobble interference is smaller and part of a wobble waveform in a section modulated by a waveform where the amplitude of the wobble interference is larger are interleaved.

6. The optical information recording medium according to claim 1,
    wherein a recording area is divided into a plurality of zones in a radial direction, and a different constant angular format is defined for each of the zones.

7. The optical information recording medium according to claim 4,
    the systematic code does not include information to discriminate a recording layer or information to discriminate a segment.

8. An information recording method using a land-groove optical information recording medium having a constant angular wobble format, wherein a data type held by a wobble is classified and arranged based on a frequency of occurrence of a wobble interference and for the data type where the frequency of occurrence of the wobble interference is not less than one, a waveform where an amplitude of the wobble interference is smaller than twice an amplitude of a carrier wobble is used as a wobble modulated waveform, the method comprising:
    a step of reproducing a wobble signal from the optical information recording medium;
    a step of obtaining address information from the wobble signal;

a step of generating recording start timing information with reference to the obtained address information; and a step of recording user information in a desired segment based on the timing information.

9. The information recording method according to claim 8, wherein the wobble signal includes address data and an error correction code, and the step of obtaining the address information from the wobble signal includes a step of demodulating the address data and a step of decoding the error correction code.

10. The information recording method according to claim 8, wherein data discrimination is performed adaptively to a modulated waveform applied to each part of the constant angular format.

11. An information reproduction method using a land-groove optical information recording medium having a constant angular wobble format, wherein a data type held by a wobble is classified and arranged based on a frequency of occurrence of a wobble interference and for the data type where the frequency of occurrence of the wobble interference is not less than one, a waveform where an amplitude of the wobble interference is smaller than twice an amplitude of a carrier wobble is used as a wobble modulated waveform, the method comprising:

a step of reproducing a wobble signal from the optical information recording medium;

a step of obtaining address information from the wobble signal; and a step of reading user information from a desired segment with reference to the obtained address information.

12. The information reproduction method according to claim 11, wherein the wobble signal includes address data and an error correction code, and the step of obtaining the address information from the wobble signal includes a step of demodulating the address data and a step of decoding the error correction code.

13. The information reproduction method according to claim 11, wherein data discrimination is performed adaptively to a modulated waveform applied to each part of the constant angular format.

\* \* \* \* \*